(12) United States Patent
Goda

(10) Patent No.: US 9,070,080 B2
(45) Date of Patent: Jun. 30, 2015

(54) IMAGE FORMING APPARATUS, CONTROL METHOD FOR THE SAME, AND STORAGE MEDIUM STORING A PROGRAM

(71) Applicant: CANON KABUSHIKI KAISHA, Tokyo (JP)

(72) Inventor: Keigo Goda, Kawasaki (JP)

(73) Assignee: CANON KABUSHIKI KAISHA (JP)

( * ) Notice: Subject to any disclaimer, the term of this patent is extended or adjusted under 35 U.S.C. 154(b) by 0 days.

(21) Appl. No.: 14/074,967

(22) Filed: Nov. 8, 2013

(65) Prior Publication Data
US 2014/0146341 A1 May 29, 2014

(30) Foreign Application Priority Data

Nov. 29, 2012 (JP) .................................. 2012-261627

(51) Int. Cl.
*G06K 15/00* (2006.01)
*H04N 1/00* (2006.01)
*G06K 1/00* (2006.01)

(52) U.S. Cl.
CPC .......... *G06K 15/4085* (2013.01); *G06K 15/406* (2013.01); *H04N 1/00* (2013.01)

(58) Field of Classification Search
CPC ... G03G 15/70; G03G 15/80; G03G 15/5004; G03G 15/043; G03G 2215/00548; G06K 15/1219; G06K 15/4055; G06K 15/1886; G06K 154/4085; G06K 15/406; G06F 21/78; G06F 3/128; G06F 3/1222; G06F 21/608
USPC ............ 358/1.1, 1.4, 1.5, 1.6, 1.9, 1.11, 1.12, 358/1.13, 1.14, 1.15, 1.16, 1.17, 1.18
See application file for complete search history.

(56) References Cited

FOREIGN PATENT DOCUMENTS

JP 2003-118881 A 4/2003
JP 2003118881 A * 4/2003

* cited by examiner

*Primary Examiner* — Thierry L Pham
(74) *Attorney, Agent, or Firm* — Rossi, Kimms & McDowell LLP

(57) ABSTRACT

An image forming apparatus that can start up with an engine unit being in a non-power-distributed state and a control method for the same are provided. Information indicating the error in an engine unit is stored in a non-volatile memory, the engine unit based on the information stored in the non-volatile memory is power-distributed in a case where the image forming apparatus starts up, and if the error is detected in the engine unit that was power-distributed, notification of the error in the engine unit is made.

8 Claims, 8 Drawing Sheets

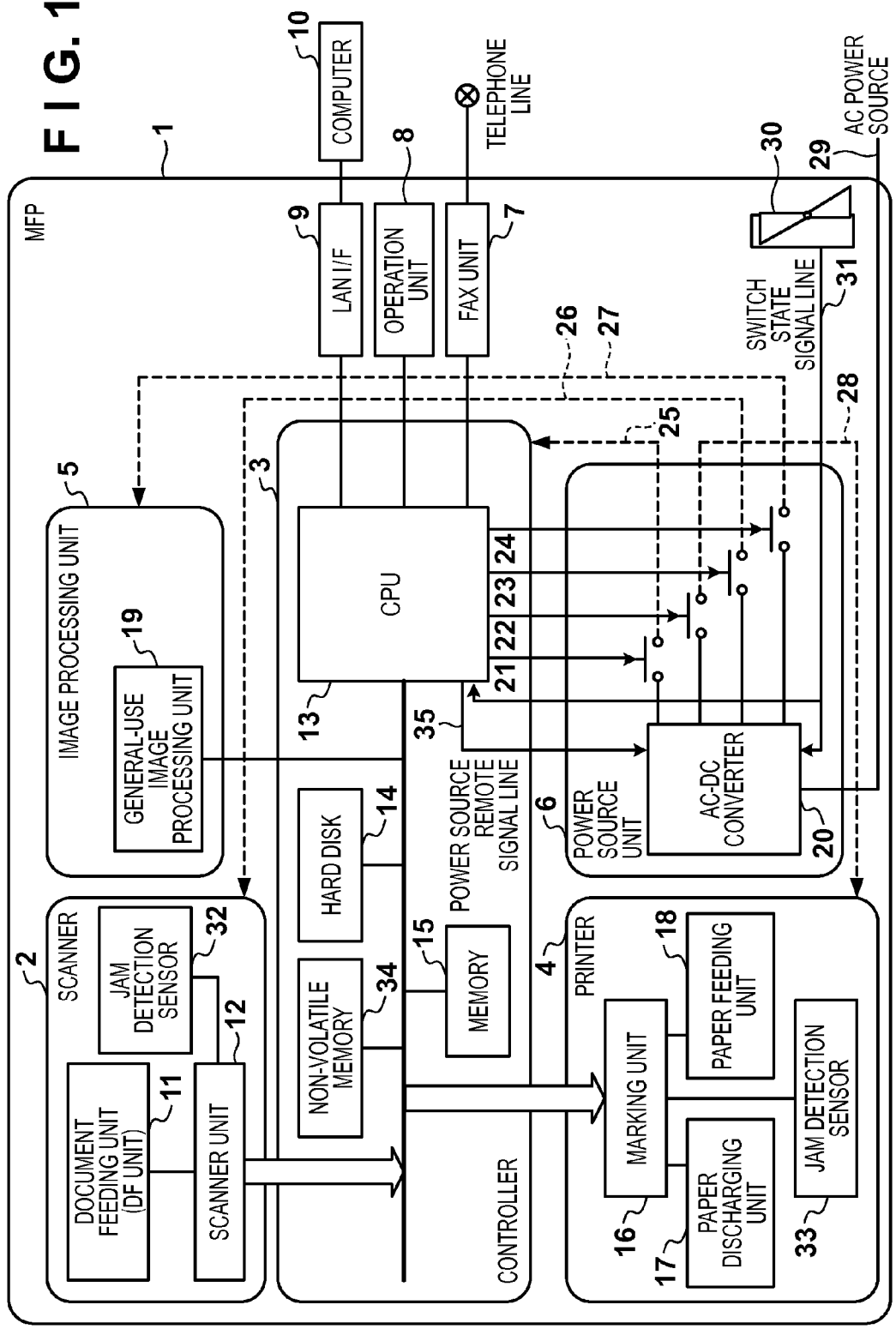

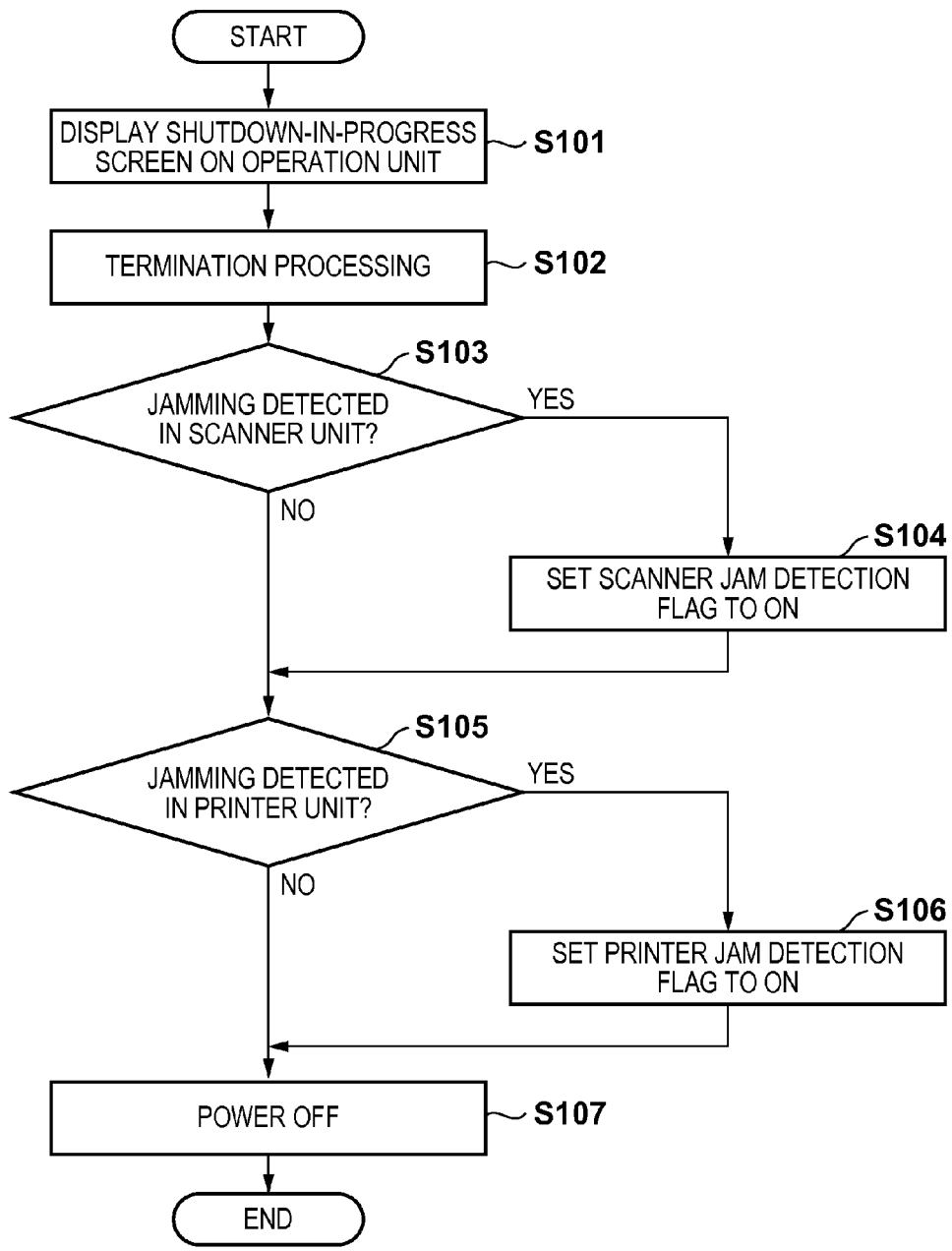

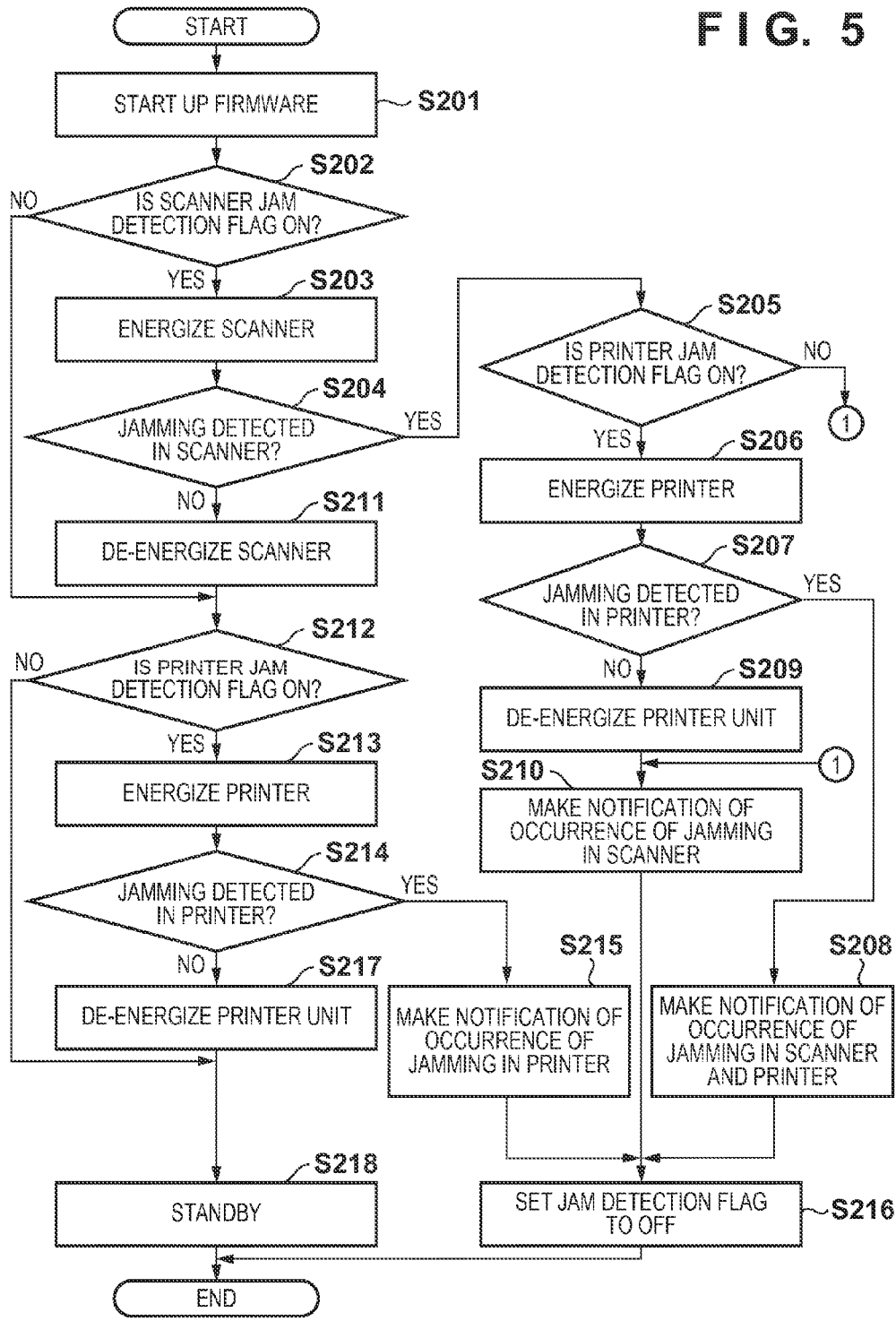

IMAGE FORMING APPARATUS, CONTROL METHOD FOR THE SAME, AND STORAGE MEDIUM STORING A PROGRAM

BACKGROUND OF THE INVENTION

1. Field of the Invention

The present invention relates to an image forming apparatus, a control method for the same, and a storage medium storing a program.

2. Description of the Related Art

With image forming apparatuses, there are cases where paper jamming (i.e., jamming) occurs in the complex mechanism therein while image formation is in progress. Because of this, the image forming apparatus is provided with a jam detection sensor for detecting jams in the engine unit, and is configured such that if jamming is detected by the sensor, an image forming operation is interrupted and a user is notified of the jamming. Accordingly, due to the user removing the jammed paper and the like and causing the image forming apparatus to return from the jammed state to a normal state, the image forming apparatus again enters a state in which it is possible to execute the image forming operation.

However, even if jamming occurs, there are cases where the power source of the image forming apparatus is powered off by a user operation performed while the cause of the jamming has not been eliminated and the jammed state still exists. In such a case, the image forming operation cannot be performed while in the jammed state, and therefore, with a general image forming apparatus, notification of jamming will be made once again when the power source of the image forming apparatus is switched on the next time.

In order to realize this function, with a conventional image forming apparatus, a jam detection sensor is used to detect whether or not jamming has occurred when the power is switched on, or the fact that jamming occurred is stored in a non-volatile storage device and notification of the jamming is made based on the stored content the next time the power source is switched on. For example, Japanese Patent Laid-Open No. 2003-118881 discloses a technique in which the fact that jamming occurred while image formation was in progress is stored in a non-volatile storage device. Then, when the image forming apparatus is powered off without a jam countermeasure being taken, notification of the fact that jamming occurred is made based on the content stored in the non-volatile storage device when the image forming apparatus is powered on the next time.

On the other hand, in recent years, interest in power conservation in image forming apparatuses has been increasing. In view of this, in order to suppress power consumption in image forming apparatuses, there are image forming apparatuses that include power-saving functions for energizing only areas that are needed for image forming operations for only the necessary amount of time. With image forming apparatuses that include these power-saving functions, in order to further reduce the power consumption of the overall image forming apparatus, startup is performed without energizing an engine unit when the image forming apparatus is activated. Then, by energizing the engine unit for the first time at the point in time when an image formation operation is instructed and de-energizing the engine unit once again when the formation operation is complete, the time period during which the engine unit is energized, which consumes a large amount of power, is made as short as possible and power consumption is suppressed.

In this kind of image forming apparatus, if the image forming apparatus is powered off while in the jammed state, the engine unit is not immediately energized as stated above when the image forming apparatus is powered on the next time. Accordingly, since the engine unit is not energized when the power source is switched on, the jam detection sensor cannot detect the jamming at that point in time, and the earliest time at which the jam detection sensor can detect the jamming is the point in time when the start of the image forming operation is instructed. In other words, even if jamming has occurred, the user cannot be notified of that fact when the image forming apparatus is started up.

If jamming occurs, it is desirable that the user is notified to that effect immediately when the image forming apparatus is started up. This is because it is time-consuming to resolve a jammed state, and noticing the jamming for the first time and performing a task of resolving the jamming after the user has instructed the image formation causes a problem in terms of operability and user-friendliness.

Also, a case is possible in which the user resolves jamming by removing the paper jamming that is the cause of the jamming when the image forming apparatus is in a powered-off state. In such a case, since the jamming has already been resolved when the image forming apparatus is powered on the next time, it is desirable that no notification of jamming is made. Because of this, it is necessary to detect that jamming has not occurred using the jam detection sensor when the image forming apparatus is powered on. However, with an image forming apparatus that is started up without the engine unit being energized, detection using the jam detection sensor cannot be performed at the time of startup, and therefore there is a problem in that accurate jam information cannot be notified to the user.

SUMMARY OF THE INVENTION

An aspect of the present invention is to eliminate the above-mentioned problems with the conventional technology.

The present invention provides a technique of normally starting up an information processing apparatus without energizing an engine unit, and energizing the engine unit for the first time and checking whether or not error has occurred when the fact that error has occurred in the engine unit is stored. Accordingly, an image forming apparatus having reduced power consumption at the time of startup, a control method for the same, and a storage medium storing a program are provided.

The present invention in its first aspect provides an image forming apparatus which comprises an engine unit, the image forming apparatus comprising: a non-volatile storage unit configured to store information indicating error in the engine unit; a power control unit configured to control, in a case where the image forming apparatus starts up, to distribute power to the engine unit based on the information stored in the non-volatile storage unit; a detection unit configured to detect, after the power is distributed to the engine unit, error based on notification from the engine unit; and a notification unit configured to notify, in a case where the detection unit detects the error, the error.

According to the present invention, even in the case where an image forming apparatus is powered off while error has occurred, it is possible to notify the user of the error in a case where the image forming apparatus starts up, and both user-friendliness and power conservation can be achieved. Also, since a detection means can detect whether or not error has occurred at the time of startup, no notification of error is made in the case where, for example, error was addressed while the image forming apparatus was powered off, and therefore unnecessary notification is not made.

Further features of the present invention will become apparent from the following description of exemplary embodiments with reference to the attached drawings.

BRIEF DESCRIPTION OF THE DRAWINGS

FIG. 1 is a block diagram showing a configuration of a multi-function peripheral (MFP) according to an embodiment.

FIG. 4 is a flowchart for describing shutdown processing performed by the MFP according to the embodiment.

FIG. 5 is a flowchart for describing operations at the time of startup of the MFP according to the embodiment.

DESCRIPTION OF THE EMBODIMENTS

Figure 2A:
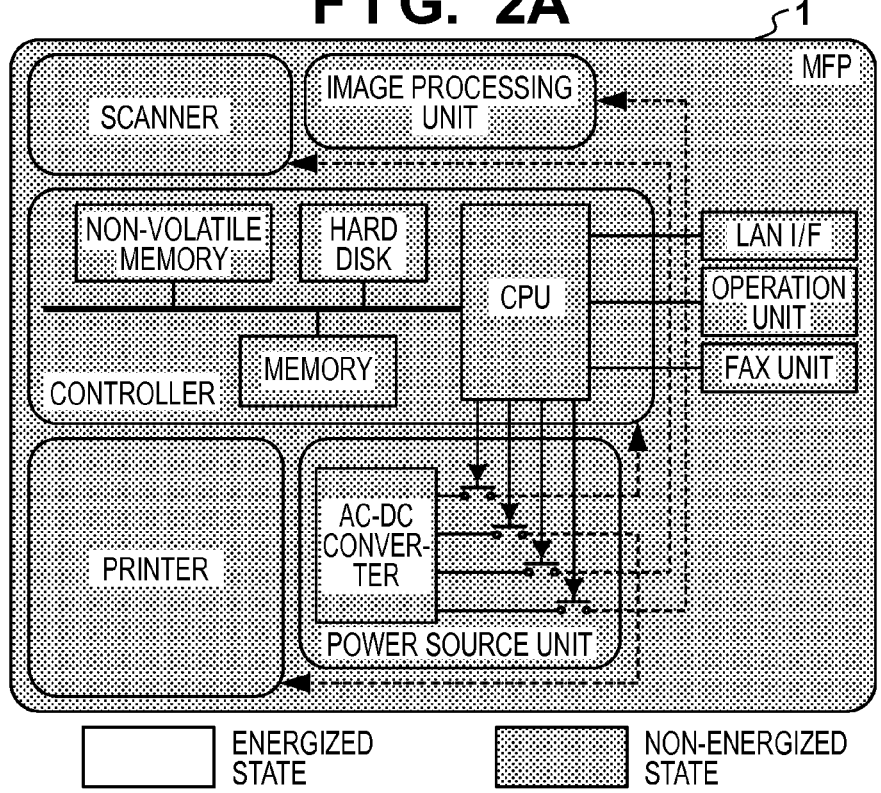
FIGS. 2A to 2H are diagrams for describing the energization states of units (devices) in the MFP according to the embodiment.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Identical constituent elements will be denoted by identical reference signs, and the descriptions thereof will not be repeated. In the present embodiment, a multi-function peripheral will be described as an example of an image forming apparatus.

FIG. 1 is a block diagram showing the configuration of an MFP 1 according to an embodiment of the present invention.

A scanner 2 optically reads an original image, converts it to digital image data and outputs it. A controller 3 has a CPU 13, a hard disk 14, a memory 15, and a non-volatile memory 34 and performs overall control of the MFP 1. A printer 4 prints on paper based on digital image data. An image processing unit 5 executes various types of image processing on image data output from the scanner 2 and image data received via a LAN interface 9. An operation unit 8 is operated by a user and receives various types of information for operating the MFP 1. A fax unit 7 transmits and receives digital images via a public telephone line or the like. The controller 3 is connected to these units and executes jobs in the MFP by outputting instructions to the units.

Also, the operation unit 8 includes a display panel (not shown) capable of notifying the user of jamming or the like. Also, the MFP 1 can input and output digital image data, issue jobs, instruct devices, and the like with a computer 10 via the LAN interface 9.

The scanner 2 has a document feeding unit 11 that feeds originals one page at a time from a stacked bundle of originals, and a scanner unit 12 that optically scans the originals and converts them to digital images, and the converted image data is transmitted to the controller 3. Also, the scanner 2 includes a jam detection sensor 32 for detecting jamming in the document feeding unit 11.

The printer 4 includes a paper feeding unit 18 for conveying and feeding sheets one by one from a stack of sheets, a marking unit 16 for printing image data on a fed sheet, and a paper discharge unit 17 for discharging sheets after printing. A jam detection sensor 33 for detecting jamming in the paper discharge unit 17 or the paper feeding unit 18 is also included.

The controller 3 temporarily stores image data received from the scanner 2 in the memory 15. Subsequently, the scanning of an image by the scanner 2 and the storage of the image data are completed due to the image data being stored in the hard disk 14. Also, the controller 3 reads out the image data stored in the hard disk 14, temporarily stores it in the memory 15, and outputs the image data from the memory 15 to the printer 4, and thereby it is possible to perform printing. Also, after the image data that was stored in the memory 15 undergoes processing such as size reduction for example, using a general-use image processing unit 19 of the image processing unit 5, it can be stored in the memory 15 once again. The general-use image processing unit 19 is used in various cases as needed.

The non-volatile memory 34 is used to stored firmware for the MFP 1, user setting values, and the like, is generally configured by a flash memory or the like, and can hold the stored content even when the MFP 1 is in a powered-off state.

Functions included in the MFP 1 will be described next. These functions are activated by an instruction from a user operating the operation unit 8, or by the CPU 13 interpreting instructions received via the LAN interface 9.

Copying Function

Image data obtained by the scanner 2 is stored in the hard disk 14 and is printed using the printer 4 at the same time.

Image Transmission Function

Image data obtained by the scanner 2 is stored in the hard disk 14 and transmitted to the computer 10 via a LAN interface 9.

Image Storage Function

Image data obtained by the scanner 2 is stored in the hard disk 14 and is transmitted and printed as needed.

Image Printing Function

A page description language, for example, that was received from the computer 10 via the LAN interface 9 is analyzed and is printed using the printer 4.

Fax Reception Printing

Fax image data received by the fax unit 7 is stored in the hard disk 14 and is printed using the printer 4 at the same time.

Fax Transfer Processing

Fax image data received by the fax unit 7 is stored in the hard disk 14 and is transferred to the computer 10 or the like via the LAN interface 9 at the same time.

Fax Memory Reception Processing

Fax image data received by the fax unit 7 is stored in the hard disk 14, and an instruction from the operator is waited for.

Fax Transmission Processing

Image data obtained by the scanner 2 is stored in the hard disk 14 and is transmitted from the fax unit 7 over a public telephone line at the same time.

Note the hard disk 14 is used in many of the above-described functions in order to recover the image data in the case where a job fails or there is an abnormal state such as a power interruption.

A power source unit 6 will be described next. The power source unit 6 is a device for supplying power in the MFP 1. A power switch 30 for the user to power the MFP 1 on and off is connected to the power source unit 6, and an AC-DC converter 20 and the CPU 13 are notified of the on/off state of the power switch 30 via a switch state signal line 31. By operating the power switch 30, the user can power the MFP 1 on and off. By switching on the power switch 30, AC power 29 is supplied to the AC-DC converter 20 and DC power is created. On the other hand, when the power switch 30 is switched off, the supply of power to the controller 3 must not be stopped until the controller 3 completes system shutdown. In this case, the CPU 13 is notified of the state of the power switch 30 via the switch state signal line 31, and after the shutdown is complete, the CPU 13 stops the supply of all power using a power source remote signal line 35. The power source unit 6 can perform control of four independent power supplies for the entire MFP according to instructions from the CPU 13. That is to say, a switch signal 21 from the CPU 13 can switch on and off power 25 that is supplied to the controller 3. Similarly, a switch signal 22 can switch on and off power 28 that is supplied to the printer 4. Also, a switch signal 23 can switch on and off power 26 that is supplied to the scanner 2, and a switch signal 24 can switch on an off power 27 that is supplied to the image processing unit 5. In this way, the CPU 13 uses these switch signals 21 to 24 to appropriately supply power to the necessary areas of the MFP 1.

Various power states when the MFP 1 of the embodiment is powered on will be described below with reference to FIGS. 2A to 2H.

FIGS. 2A to 2H are diagrams for describing energization (power-distributed) states of the units (devices) in the MFP 1 according to the embodiment. FIG. 2A shows a state in which the MFP 1 is powered off and power is not being supplied to any part of the MFP 1. Note that in FIGS. 2A to 2H, the reference numerals that were shown in FIG. 1 are omitted.

Standby

Figure 2B:
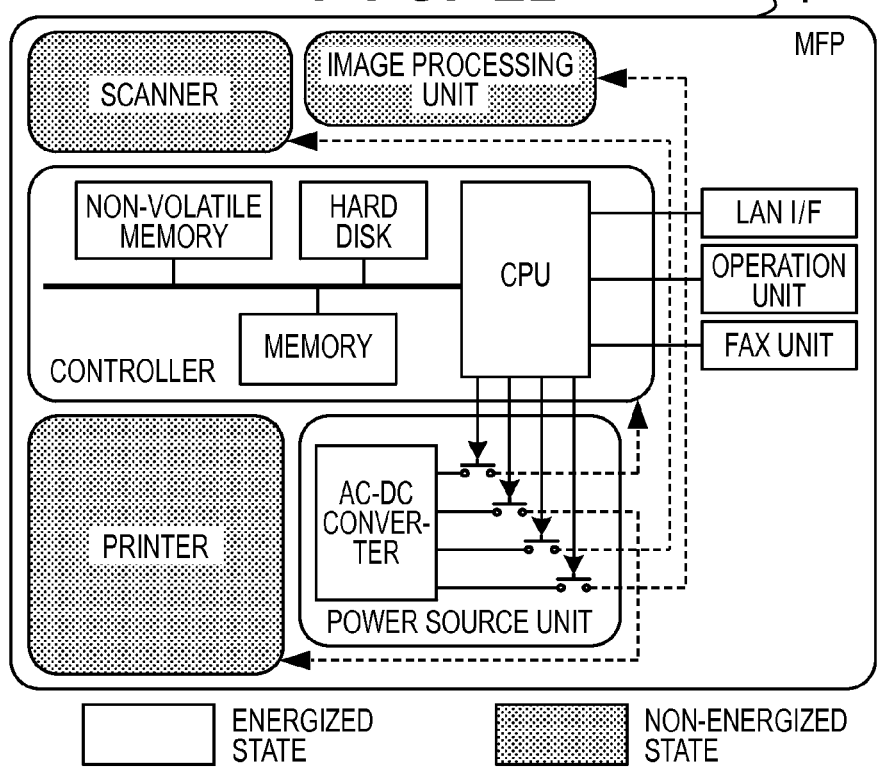

This is a state in which the power 25 is supplied to the controller 3. The MFP 1 enters this state after being powered on or after completing an image formation operation. The energization states of the units at that time are as shown in FIG. 2B.

In this state, it is possible to receive operations performed by a user on the operation unit 8 or jobs from a network via the LAN interface 9 and also receive a facsimile or the like. In this state, the power 28 for the printer 4, the power 26 for the scanner 2, and the power 27 for the image processing unit 5 are switched off. Because of this, when a job is instructed, the CPU 13 supplies power to portions needed for the execution of the job using the switch signals 22 to 24 and subsequently executes the job.

For example, the units can be powered on as follows according to the type of job and can enter various power supply states.

Copying Function

Figure 2C:
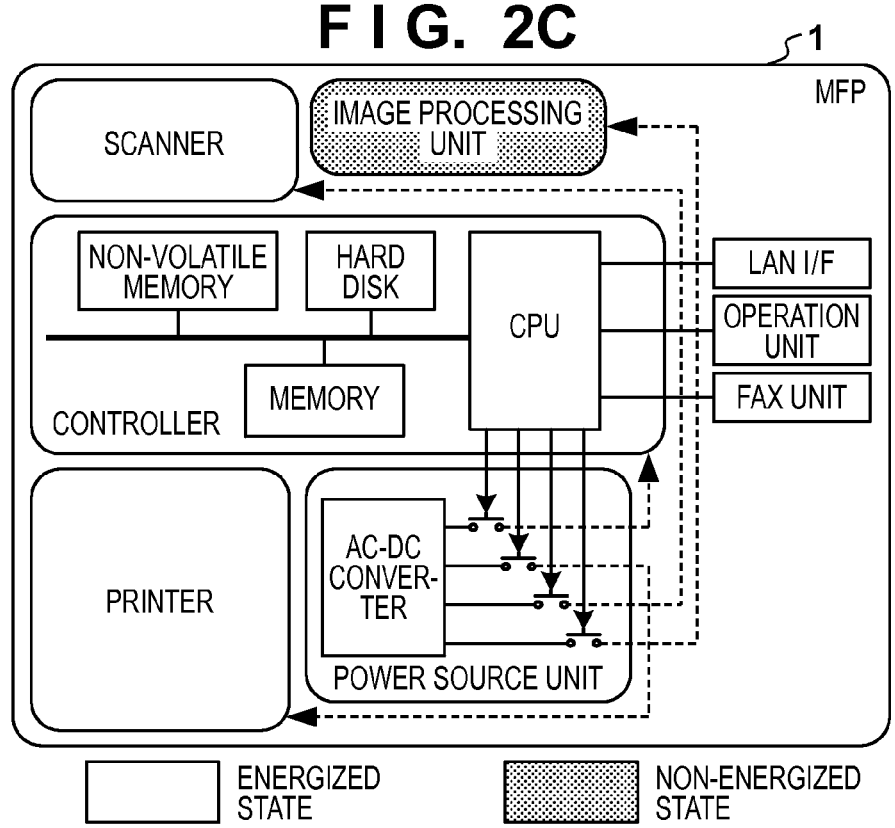

The power 26 for the scanner 2 and the power 28 for the printer 4 are switched on and the copying function is realized as described above. In this case, the energization states are as shown in FIG. 2C.

Image Transmission Function

Figure 2D:
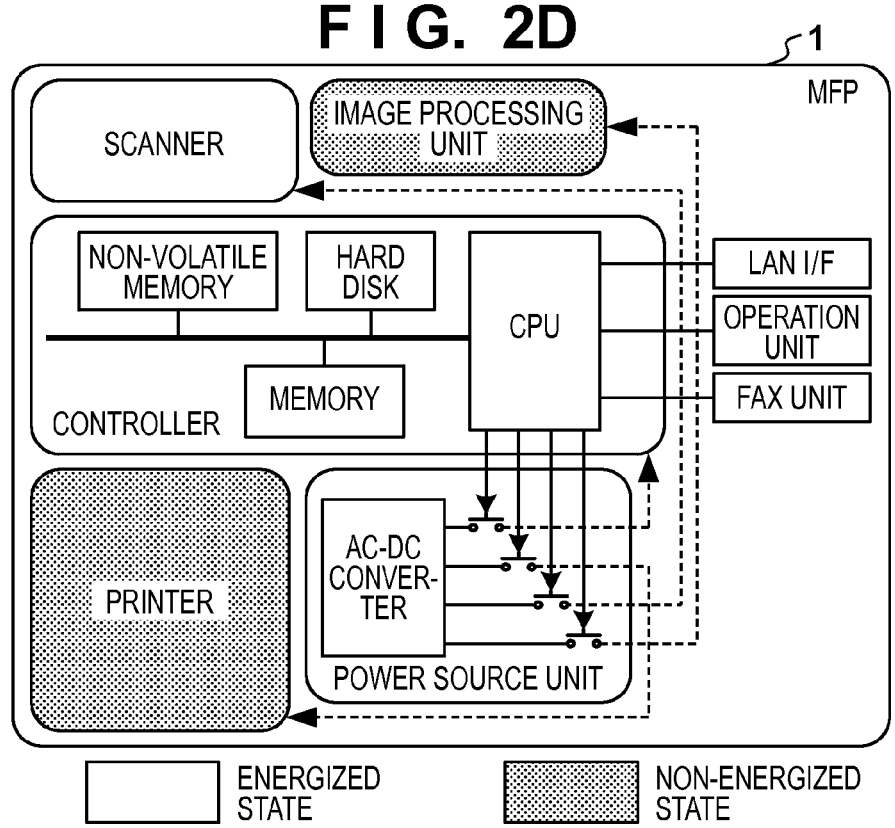

The power 26 for the scanner 2 is switched on, and the read image data is transmitted. The energization states are as shown in FIG. 2D.

Image Storage Function

The power 26 for the scanner 2 is switched on, and the read image data is stored in the hard disk 14. The energization states are as shown in FIG. 2D.

Image Printing Function

Figure 2E:
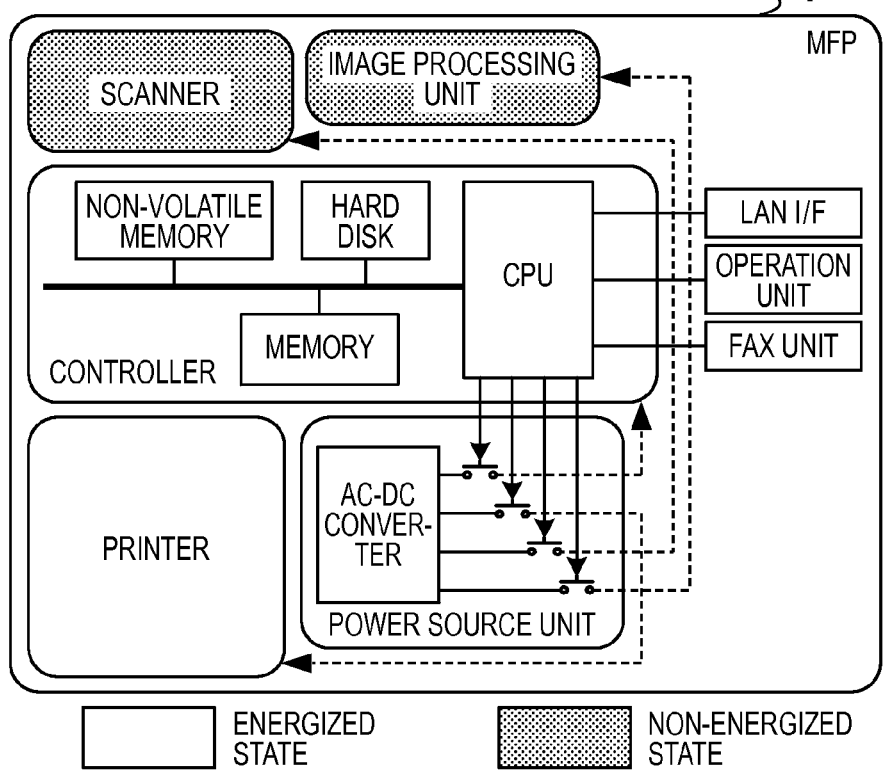

The power 28 for the printer 4 is switched on and image data stored in the hard disk 14 or image data received via the LAN interface 9 is printed. The energization states are as shown in FIG. 2E.

Fax Reception Printing

Figure 2F:
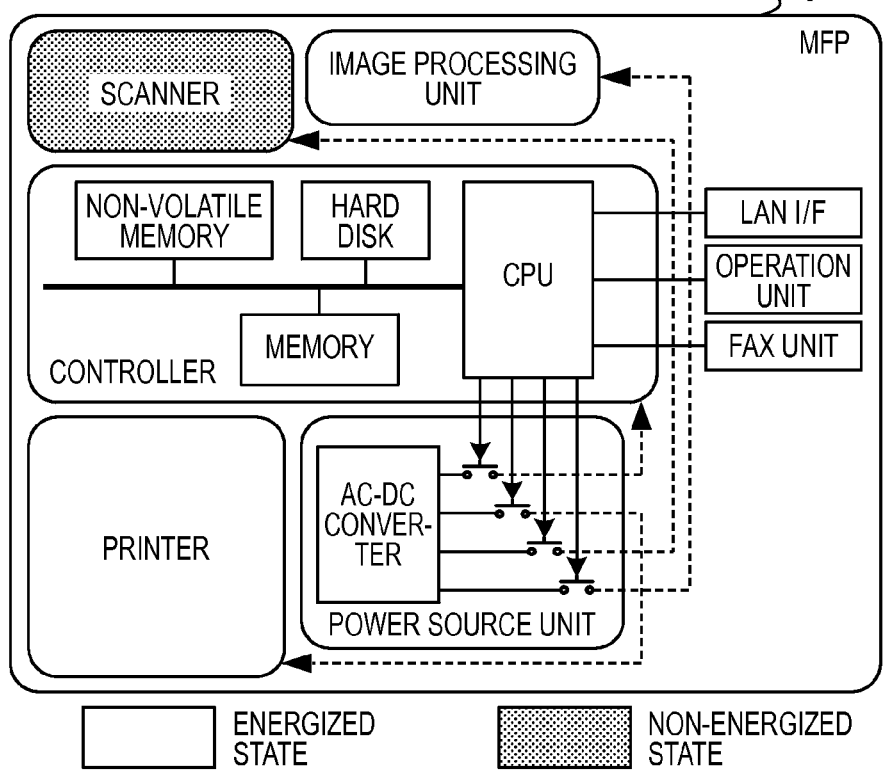

The power 28 for the printer 4 and the power 27 for the image processing unit 5 are switched on and fax image data that was received is subjected to image processing and subsequently printed. The energization states are as shown in FIG. 2F.

Fax Transfer Processing

Figure 2G:
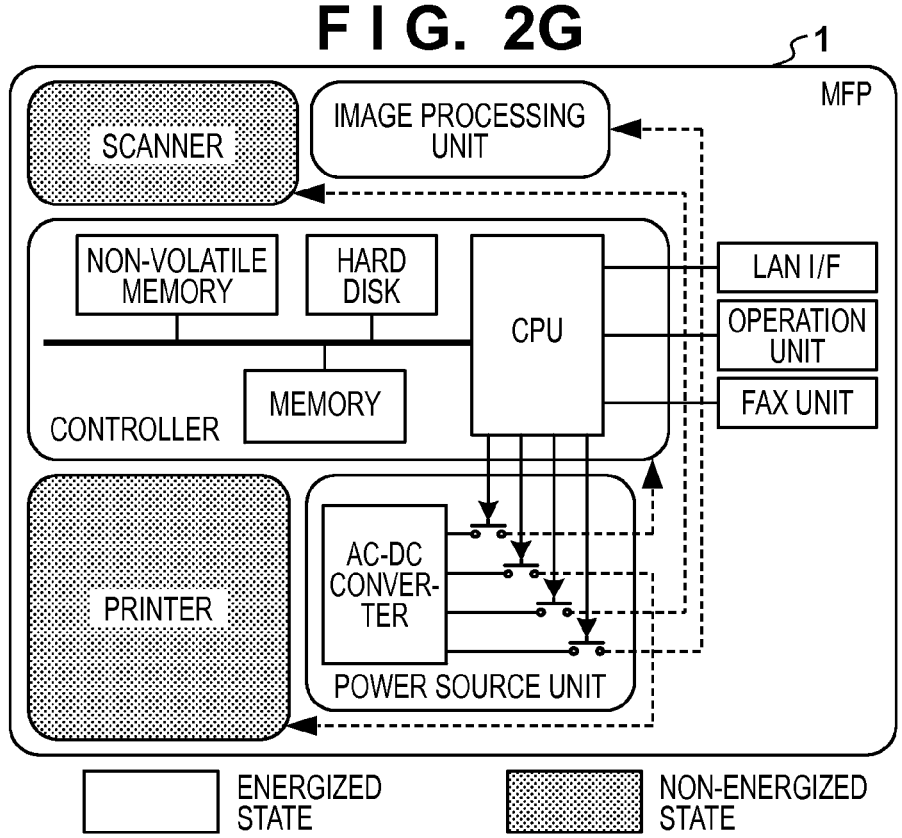

The power 27 for the image processing unit 5 is switched on and image data that was received by fax is subjected to image processing in the general-use image processing unit 19 and subsequently transferred. The energization states are as shown in FIG. 2G.

Fax Memory Reception Processing

The power 27 for the image processing unit 5 is switched on and image data that was received by fax is subjected to image processing and subsequently stored in the hard disk 14. The energization states are as shown in FIG. 2G.

Fax Transmission Processing

Figure 2H:
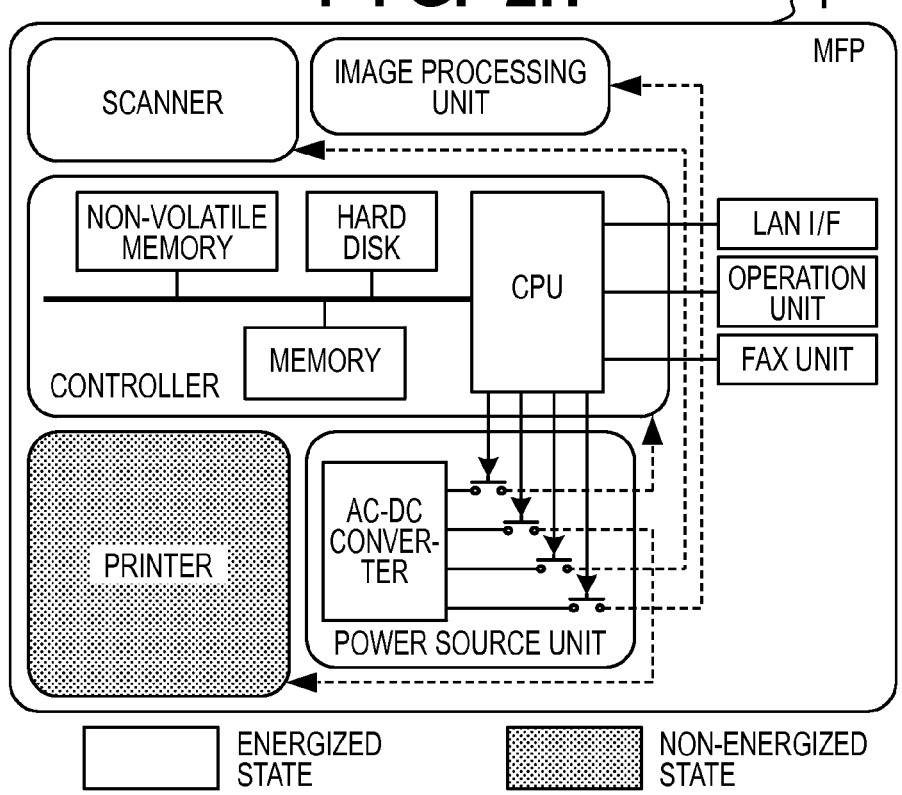

The power 26 for the scanner 2 and the power 27 for the image processing unit 5 are switched on and fax image data that was read is transmitted over a public telephone line. The energization states are as shown in FIG. 2H.

After these jobs are complete, the CPU 13 switches off the power for the units (devices) and returns to the previously-described standby mode (FIG. 2B), thus enabling the execution of jobs with only the necessary parts energized. Accordingly, it is possible to reduce the standby power of the MFP 1.

A configuration of the scanner 2 and the printer 4 of the MFP 1 according the present embodiment will be described next with reference to FIG. 3.

Figure 3:
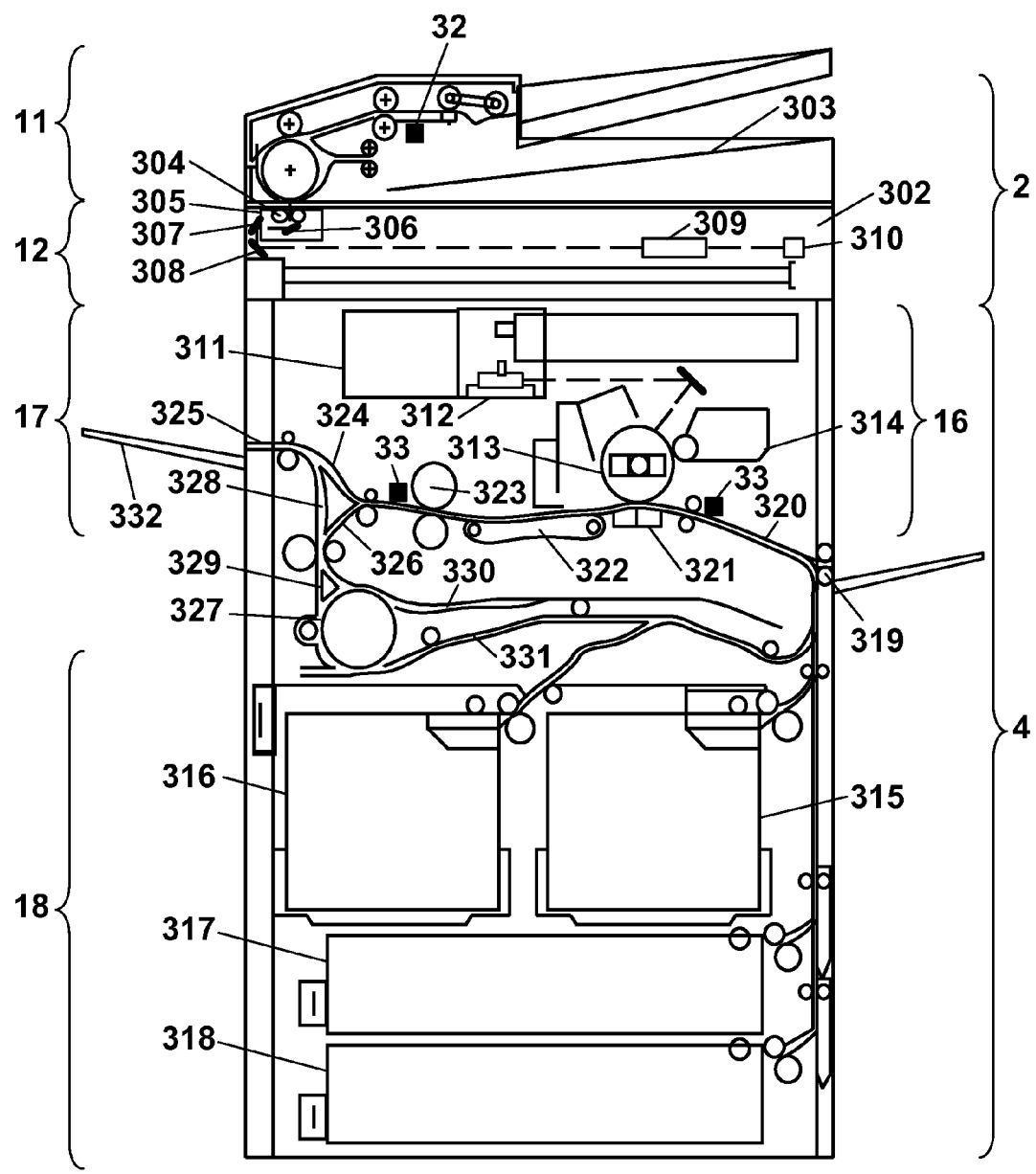
FIG. 3 is a cross-sectional view of the structure of the MFP according to the embodiment.

FIG. 3 is a cross-sectional view of the structure of the MFP 1 according to the present embodiment. Note that in FIG. 3, elements that are the same as those in FIG. 1 are denoted by the same reference numerals.

The original feeding unit 11 of the scanner 2 feeds originals sheet by sheet in order from the top to a platen glass 302 to enable scanning of the originals, and after scanning of the originals is complete, discharges the originals on the platen glass 302 to an discharge ion tray 303. The jam detection sensor 32 that can detect the conveyance state of an original is provided on an original conveyance path. When an original is conveyed to the platen glass 302, a lamp 304 is lit, movement of an optical unit 305 is started, and the original is scanned with light. At this time, reflected light from the original is guided to a CCD image sensor (hereinafter referred to as "CCD") 310 by mirrors 306, 307, and 308, and a lens 309. By doing so, the image of the scanned original is read by the CCD 310. Image data output from the CCD 310 is transferred to the printer 4 or the general-use image processing unit 19.

The configuration and operation of the printer 4 will be described next.

A laser driver 311 in the printer 4 drives a laser emission unit 312 and causes laser light to be emitted according to input image data. A photoconductive drum 313 is irradiated with the laser light, and a latent image that corresponds to the laser light is formed on the surface of the photoconductive drum 313. A developer 314 attaches a developing material to the portion where the latent image was formed on the photoconductive drum 313 in this way.

The printer 4 includes a cassette 315, a cassette 316, a cassette 317, and a cassette 318, each of which are drawer-shaped, and a manual paper feeding stage 319 on a tray that is exposed to the outside of the apparatus, all of which serve as paper feeding units. When printing is to be executed, the printer 4 supplies paper (a sheet) from the cassette 315, the cassette 316, the cassette 317, the cassette 318, or the manual paper feeding stage 319. Then, the fed sheet is sent to a transfer unit 321 via the conveyance path 320, and the developing material attached to the photoconductive drum 313 is transferred to the sheet. The sheet with the developing material thereon is conveyed to a fixing unit 323 by a conveyance belt 322 and the developing material is fixed to the sheet using the heat and pressure of the fixing unit 323. Thereafter, the sheet that passed through the fixing unit 323 is discharged via a conveyance path 324 and a conveyance path 325. Alternatively, in the case of reversing the printing surface before discharging, the sheet is guided to a conveyance path 326 and a conveyance path 327, and from there the sheet is conveyed in the opposite direction and discharged via the conveyance path 328 and the conveyance path 325.

Additionally, if double-sided printing has been set, after the sheet has passed through the fixing unit 323, it is guided from a conveyance path 326 to a conveyance path 330 by a flapper 329, whereafter it is conveyed in the opposite direction and is guided by the flapper 329 to a conveyance path 327 and a conveyance path 331 for re-feeding sheets. The sheet that is guided to the re-feeding conveyance path 331 is fed to the transfer unit 321 via the conveyance path 320 at the aforementioned timing.

Then, the sheet that was discharged by the conveyance path 325 is conveyed to the discharge tray 332. Also, jam detection sensors 33 for detecting sheet jamming are included on the aforementioned conveyance paths 333 and 334.

Shutdown processing in the MFP 1 of the present embodiment will be described next with reference to FIG. 4. This processing is started by the CPU 13 detecting that the power switch 30 was switched off using the switch state signal line 31.

FIG. 4 is a flowchart for describing shutdown processing performed by the MFP according to the present embodiment. A program for executing this processing is stored in the hard disk 14 and when it is to be executed, it is loaded to the memory 15, and the processing shown in the flowchart is realized by the CPU 13 executing the program.

Note that in the MFP 1 according to the present embodiment, if jamming occurs in the scanner 2 or the printer 4, the portion in which the jamming occurred is maintained in an energized state. This is because the output of the jam detection sensors 32 and 33 is observed so that if the user addresses the jamming by removing the paper jam, that fact is immediately detected, and the job that was interrupted can be resumed.

This processing is started by the user instructing the shutdown of the MFP 1, and first in step S101, the CPU 13 starts shutdown processing and displays a message indicating that shutdown of the MFP 1 is in progress on the display panel of the operation unit 8. Next, moving to step S102, the CPU 13 performs processing for interrupting or terminating a job, a service, or the like that is currently being executed. Next, moving to step S103, the CPU 13 determines whether or not the jam detection sensor 32 included in the scanner 2 has detected jamming. If jamming has been detected, the procedure moves to step S104, and if not, the procedure moves to step S105. More specifically, if jamming has occurred in the scanner 2, the scanner 2 is in an energized state as described above, and the jam detection sensor 32 can detect the jamming. When the jam detection sensor 32 detects the jamming, the procedure moves to step S104. On the other hand, if the scanner 2 is energized due to job execution or the like being in progress, but the jam detection sensor 32 has not detected jamming, or if the scanner 2 is not in use and is in a de-energized (non-power-distributed state) state, it is deemed that jamming has not occurred in these cases. In these cases, the procedure moves to step S105. In step S104, the CPU 13 switches on a scanner jam detection flag in the non-volatile memory 34 (non-volatile storage) so as to indicate that the scanner 2 was in a jammed state at the time of shutdown, and the procedure moves to step S105.

In step S105, the CPU 13 determines whether or not a jam detection sensor 33 included in the printer 4 has detected jamming. If the printer 4 is in an energized state and it is determined that a jam detection sensor 33 has detected jamming, the procedure moves to step S106, and if not, the procedure moves to step S107. The details of this determination are similar to those in the above-described step S103.

In step S106, the CPU 13 switches on a printer jam detection flag in the non-volatile memory 34 so as to indicate that the printer 4 was in a jammed state at the time of shutdown, and the procedure moves to step S107. Then in step S107, the CPU 13 controls the power source remote signal line 35 and stops the supply of DC power from the AC-DC converter 20. Accordingly, the MFP 1 enters a powered-off state (FIG. 2A).

In this way, the CPU 13 checks whether or not jamming has been detected in the scanner 2 and the printer 4 while shutdown is being executed when the MFP 1 is powered off, and if jamming is detected, the corresponding jam detection flag is switched on and stored in the non-volatile memory 34. Accordingly, when the MFP 1 is powered on the next time, it is possible to determine whether or not jamming occurred in the scanner 2 or the printer 4 at the time of shutdown by checking the jam detection flag in the non-volatile memory 34.

FIG. 5 is a flowchart for describing operations at the time of the startup of the MFP 1 according the present embodiment. A program for executing this processing is stored in the hard disk 14, loaded to the memory 15 when execution is to be performed, and the processing shown in the flowchart is realized by the CPU 13 executing this program. This processing is started by the power switch 30 being switched on.

When this processing is started, the AC-DC converter 20 that detected that the power switch 30 was switched on via the switch status signal line 31 starts the supply of DC power. Accordingly, first, the controller 3 enters an energized state, and the CPU 13 starts to operate. The energization states at this point in time are shown in FIG. 2B. Here, neither the scanner 2 nor the printer 4 is in an energized state.

First, in step S201, the CPU 13 starts up the firmware of the MFP 1. In other words, the CPU 13 loads firmware that is an executable program stored in the non-volatile memory 34 to the memory 15. When the loading of this firmware is complete, the CPU 13 starts the execution of the program in the memory 15. Next, moving to step S202, the CPU 13 checks whether or not the scanner jam detection flag in the non-volatile memory 34 is on. If it is on, the procedure moves to step S203, and if it is not on, the procedure moves to step S212.

In step S203, the CPU 13 starts to energize the scanner 2 using the switch signal 23. Accordingly, the energization states of the MFP 1 are as shown in FIG. 2D. Next, moving to step S204, the CPU 13 determines whether or not the jam detection sensor 32 of the scanner 2 has detected jamming. At this point in time, the scanner 2 is in an energized state, and therefore it is possible to detect jamming using the jam detection sensor 32. If the jam detection sensor 32 has detected jamming, the jamming in the scanner 2 that occurred at the time of shutdown has not been resolved, and therefore the procedure moves to step S205. On the other hand, in step S204, if no jamming has been detected, it means that the jamming in the scanner 2 was resolved while the MFP 1 was powered off, and therefore the procedure moves to step S211. In step S211, the CPU 13 de-energizes the scanner 2 using the switch signal 23 and the procedure moves to step S212. Accordingly, the energization states of the MFP 1 are as shown in FIG. 2B.

In step S205, the CPU 13 checks whether or not the printer jam detection flag in the non-volatile memory 34 is on. If it is on, the procedure moves to step S206, and if it is not on, the procedure moves to step S210. In step S206, the CPU 13 sets the printer 4 to an energized state using the switch signal 22. Accordingly, the energization states of the MFP 1 are as shown in FIG. 2C, in which the scanner 2, the controller 3, and the printer 4 are energized. Then, moving to step S207, the CPU 13 determines whether or not a jam detection sensor 33 of the printer 4 has detected jamming. At this point in time, the printer 4 is in an energized state, and therefore it is possible to detect jamming in the printer 4 using the jam detection sensors 33. If a jam detection sensor 33 has detected jamming, the procedure moves to step S208, and if jamming has not been detected, the procedure moves to step S209. In step S208, the user is notified of the jamming by the CPU 13 displaying a message indicating that jamming has occurred in both the scanner 2 and the printer 4 on the display panel of the operation unit 8, and the processing moves to step S216.

On the other hand, if the jam detection sensors 33 of the printer 4 have not detected jamming in step S207, the procedure moves to step S209, the CPU 13 de-energizes the printer 4 using the switch signal 22, and the procedure moves to step S210. Accordingly, the energization states of the MFP 1 are as shown in FIG. 2D. In step S210, the user is notified by the CPU 13 displaying a message indicating that jamming has occurred in the scanner 2 on the display panel of the operation unit 8, and the procedure moves to step S216.

On the other hand, in step S202, if it is determined that the scanner jam detection flag in the non-volatile memory 34 is off, the procedure moves to step S212, and the CPU 13 determines whether or not the printer jam detection flag in the non-volatile memory 34 is on. If it is on, the procedure moves to step S213, and if it is not on, the procedure moves to step S218. In step S213, the CPU 13 energizes the printer 4 using the switch signal 22, and the procedure moves to step S214. Accordingly, the energization states of the MFP 1 are as shown in FIG. 2E.

In step S214, the CPU 13 determines whether or not a jam detection sensor 33 of the printer 4 has detected jamming. If a jam detection sensor 33 has detected jamming in the printer 4, the procedure moves to step S215, and if jamming has not been detected, the procedure moves to step S217. In step S215, the CPU 13 displays a message indicating that jamming has occurred in the printer 4 on the display panel of the operation unit 8, and the procedure moves to step S216. In step S216, the CPU 13 switches off the scanner jam detection flag and/or the printer jam detection flag recorded in the non-volatile memory 34.

Additionally, in step S214, if the jam detection sensors 33 of the printer 4 have not detected jamming, the procedure moves to step S217, the CPU 13 de-energizes the printer 4 using the switch signal 22, and the procedure moves to step S218. Accordingly, the energization states of the MFP 1 are as shown in FIG. 2B, in which the controller 3 is energized.

The processing of step S218 is executed in the case where both the scanner jam detection flag and the printer jam detection flag recorded in the non-volatile memory 34 are off, and in the case where jamming has occurred in neither the scanner 2 nor the printer 4. In step S218, the CPU 13 completes the startup of the MFP 1, and sets the MFP 1 to a standby state in which job reception is enabled.

According to this startup processing, when jamming has occurred in the scanner and/or the printer at the time of shutdown, it is possible to determine whether or not the jamming was resolved while the MFP was powered off and to warn the user only if the jamming has not been resolved.

As described above, according to the present embodiment, it is possible to detect and make a notification of jamming that has already occurred at the time of startup, even in the case of using an MFP configured to start up with an engine unit such as a scanner or a printer being in a de-energized state.

Note that in the embodiment, an MFP including multiple engine units was described as an example, but the present invention is not limited to this and an image forming apparatus including a single engine unit may be used as well.

Additionally, the engine unit is energized in order to make a notification of jamming at the time of startup only in the case where jamming occurred at the point in time when the MFP was powered off. Accordingly, if no jamming occurred when the MFP was powered off, startup is performed with the engine unit being in a de-energized state, and therefore there is no unnecessary consumption of power. Furthermore, based on the occurrence of jamming at the point in time when the power of the MFP was switched off, control is performed so as to determine whether or not the scanner and the printer are to be energized at the time of starting up the MFP, and only the necessary portions are energized. By doing so, it is possible to achieve both user-friendliness and power conservation.

Additionally, at the time of starting up the MFP, the jam detection sensor of the engine unit determines whether or not jamming has occurred. Accordingly, if the user has addressed the jamming by removing the cause thereof during the period in which the MFP was powered off, no notification of jamming is made when the MFP is powered on. Because of this, unnecessary notifications of jamming are not made, and user-friendliness is improved.

Other Embodiments

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-261627, filed Nov. 29, 2012, which is hereby incorporated by reference herein in its entirety.

What is claimed is:

1. An image forming apparatus which comprises an engine unit, the image forming apparatus comprising:
 a non-volatile storage unit configured to store information indicating an error in the engine unit;
 a power control unit configured to control, in a case where the image forming apparatus starts up, to distribute power to the engine unit if the information indicating the error is stored in the non-volatile storage unit and to not distribute power to the engine unit if the information indicating the error is not stored in the non-volatile storage unit;
 a detection unit configured to detect, after the power is distributed to the engine unit, the error based on notification from the engine unit; and a notification unit configured to notify, in a case where the detection unit detects the error, the error.

2. The image forming apparatus according to claim 1, wherein each of a plurality of engine units includes at least a printer and a scanner, and the information indicating the error is stored in the non-volatile storage unit for each engine unit.

3. The image forming apparatus according to claim 1, wherein the error is jamming in the engine unit.

4. A control method of controlling an image forming apparatus which comprises an engine unit, the method comprising:

storing information indicating an error in the engine unit in a non-volatile memory;

controlling, in a case where the image forming apparatus starts up, to distribute power to the engine unit if the information indicating the error is stored in the non-volatile memory and to not distribute power to the engine unit if the information indicating the error is not stored in the non-volatile storage memory;

detecting, after the power is distributed to the engine unit, the error based on notification from the engine unit; and notifying, in a case where the error is detected, the error.

5. A non-transitory computer-readable storage medium storing a program for causing a computer to execute a control method for controlling an image forming apparatus which comprises an engine unit, the program comprising:

a code to store information indicating an error in the engine unit in a non-volatile memory;

a code to control, in a case where the image forming apparatus starts up, to distribute power to the engine unit if the information indicating the error is stored in the non-volatile memory and to not distribute power to the engine unit if the information indicating the error is not stored in the non-volatile storage memory;

a code to detect, after the power is distributed to the engine unit, the error based on notification from the engine unit; and a code to notify, in a case where the error is detected, the error.

6. The image forming apparatus according to claim 1, wherein the detection unit is configured to detect continued existence of the error based on notification from the engine unit.

7. The image forming apparatus according to claim 5, wherein the notification unit, in a case where the detection unit does not detect continued existence of the error, does not notify the error.

8. An image forming apparatus which comprises an engine unit, the image forming apparatus comprising:

a non-volatile storage unit configured to hold information relating to existence of an error in the engine unit;

a power control unit configured to control, in a case where the image forming apparatus starts up, to either distribute power to the engine unit or not distribute power to the engine unit according to the information relating to existence of the error held by the non-volatile storage unit;

a detection unit configured to detect, after the power is distributed to the engine unit, continued existence of the error based on notification from the engine unit; and a notification unit configured to notify, in a case where the detection unit detects the continued existence of the error, the error, wherein the non-volatile storage unit is configured to hold information indicating the existence of the error in the engine unit, and the power control unit distributes power to the engine unit if the information indicating the existence of the error is stored in the non-volatile storage unit and does not distribute power to the engine unit if the information indicating the existence of the error is not held in the non-volatile storage unit.

* * * * *